: 3,455,699
LIQUID SHORTENING PROCESS
Richard J. Bell, Robert L. Campbell, Albert E. Brust, and Lloyd R. Custer, Sherman, Tex., assignors to Anderson, Clayton & Co., Houston, Tex., a corporation of Delaware
No Drawing. Filed June 2, 1966, Ser. No. 554,661
Int. Cl. A23d 5/02
U.S. Cl. 99—118    17 Claims

ABSTRACT OF THE DISCLOSURE

A process for the manufacture of a liquid shortening including forming a molten blend of an oil, fat having a melting point in excess of approximately 100° F. and an emulsifier containing mono- or diglycerides; rapidly cooling the blend to a temperature near the cloud point of the emulsifier; agitating the blend in excess of approximately 30 minutes while maintaining the blend at a temperature between approximately that reached by the heat of crystallization of the blend and the capillary melting point of the emulsifier; rapidly cooling the blend to a temperature near the cloud point of the fat; and agitating the blend in excess of approximately 30 minutes while maintaining the blend at a temperature between approximately that reached by the heat of crystallization of the blend and the capillary melting point of the crystals existing in the oil and fat prior to the formation of the molten blend.

---

In the preparation of certain baked goods such as cakes and breads using shortening as one of the ingredients, it is necessary during the batter preparation to incorporate the liquid ingredients into the dry material in the form of small droplets surrounded by a thin layer of fat and to mix air in the form of tiny bubbles through the batter. This results in a cake or bread of good volume and texture. To accomplish the formation of small air and liquid droplets, it is necessary to add a material that exhibits surface activity between the aqueous and fat surfaces. This material is commonly known as an emulsifier.

Mono- and diglycerides and mixtures thereof are commonly used as emulsifiers.

Mono- and diglyceride emulsifiers are normally, but not always, solid at room temperature and when such emulsifiers are blended with a liquid base oil the crystals in the emulsifier and those that are present in the liquid base oil tend to settle and the viscosity of the blend tends to change, that is, the blend is unstable. An excellent liquid shortening utilizing mono- and diglyceride emulsifiers is a stable suspension of solid discrete particles or crystals of the emulsifier and the liquid base oil in the liquid base oil at a temperature range of about 60° F. to about 100° F. The suspension should remain fluid throughout this temperature range without any significant change in viscosity and without any significant separation or settling of the solid fraction. These are rigid requirements and it is exceedingly difficult to prepare a liquid shortening which will meet them.

It is a major object of the present invention to provide a process of preparing such a liquid shortening utilizing mono- and/or diglyceride emulsifiers which shortening comprises a stable suspension of solid discrete crystals of the emulsifier and of the liquid base oil in the liquid base oil in a temperature range from about 60° F. to 100° F. and which remains liquid throughout this range without any significant change in viscosity or significant separation or settling of the solid fraction.

It is known that glycerides may be crystallized in any one of a number of forms depending on the temperature and speed at which crystallization is permitted to take place. The three general classifications of crystalline forms of glycerides in the art are the alpha, the beta and the beta prime form. As is well known in the art, the alpha crystalline form is the least stable and has the lowest melting point of these forms. The beta crystalline form is generally the most stable and has the highest melting point. The beta prime crystalline form is intermediate between the alpha and beta crystalline forms in stability and melting point.

Liquid shortenings having the most desirable properties are believed to have their glycerides, or a predominate portion thereof, in the beta crystalline form. Applicants believe that in their process of preparing liquid shortening the crystals of both the emulsifier and the liquid base oil are predominately in the beta form in the liquid shortening produced, but whether this is true or not, the method of the applicants does produce a stable liquid shortening containing emulsifiers of mono- and diglyceride esters.

It is a further object of the present invention to provide a method for the manufacture of liquid shortenings containing mono- and diglyceride emulsifiers which may be practiced by utilizing conventional equipment.

Other and further objects, features and advantages will be apparent from the following description of the presently preferred examples of the invention given for the purpose of disclosure.

In general, the process of the invention is based upon the discovery that there results a liquid shortening having a stable suspension of discrete particles or crystals of (i) emulsifier of mono- or diglycerides and mixtures thereof and (ii) liquid base oil, in liquid base oil in a temperature range between about 60° F and 100° F., the emulsifier and liquid base oil being different melting point components of the liquid shortening, by carrying out the steps of:

(a) Forming a liquid base oil by mixing a vegetable oil containing solid crystals somewhere in the temperature range of approximately 32° F. to 100° F. with a fat that has a melting point in excess of approximately 100° F., said mixing taking place at temperatures sufficient to completely melt all crystals in the fat and vegetable oil, (b) Heating the emulsifier until all crystals contained therein are melted, (c) Forming a blend of melted emulsifier and liquid base oil, (d) Rapidly cooling the blend to a temperature between about 5° F. above and a temperature slightly below the cloud point of the higher melting point component, (e) Agitating the blend in excess of approximately 30 minutes while maintaining the blend at a temperature between approximately that reached by heat of crystallization of the blend and the capillary melting point of the higher melting point component, (f) Rapidly cooling the blend to a temperature between about 5° F. above and a temperature slightly below the cloud point of the lower melting point component, and (g) Agitating the blend in excess of approximately 30 minutes while maintaining the blend at a temperature between approximately that reached by heat of crystallization of the blend and the capillary melting point of (i) the crystals referred to in step (a) when the liquid base oil is the lower melting point component and (ii) the emulsifier when the emulsifier is the lower melting point component.

If desired, rather than forming the liquid base oil before mixing it with the emulsifier, the vegetable oil, the fat, and the emulsifier may all be heated and blended simultaneously, they may all be heated separately and then blended together, or any two of them may be heated and then blended with the third.

The emulsifier is normally solid and when it is it will be the higher melting point component of the liquid shortening. If the emulsifier is the lower melting point component then the process set forth above can be varied by having it comprise the steps of:

(a) Forming a liquid base oil by mixing a vegetable oil containing solid crystals somewhere in the temperature range of approximately 32° to 100° F. with a fat that has a melting point in excess of approximately 100° F., said mixing taking place at a temperature sufficient to completely melt all crystals in the fat and oil, (b) Rapidly cooling the liquid base oil to a temperature between about 5° above and a temperature slightly below the cloud point of the liquid base oil, (c) Agitating the liquid base oil in excess of approximately 30 minutes while maintaining the liquid base oil at a temperature between approximately that reached by its heat of crystallization and the capillary melting point of the liquid base oil, (d) Heating the emulsifier until all crystals contained therein are melted, (e) Forming a blend of the emulsifier and liquid base oil, (f) Rapidly cooling the blend to a temperature between about 5° above and a temperature slightly below the cloud point of the emulsifier, and (g) agitating the blend in excess of approximately 30 minutes while maintaining the blend at a temperature between approximately that reached by its heat of crystallization and the capillary melting point of the emulsifier.

The vegetable oils which may be used in accordance with this invention include those which are commonly used in liquid shortenings such as cottonseed oil, soybean oil, peanut oil, rapeseed oil, sesame seed oil and sunflower oil, and mixtures thereof which are liquid at 60° F.

The mono- or diglyceride emulsifiers and emulsifiers which are mixtures thereof include those commonly used in shortenings. Some examples are those (i) made by superglycerinating vegetable oils, lard, or tallow, and (ii) the reaction product resulting from an ester interchange reaction of glycerides of edible fat, propylene glycol and glycerin in accordance with Patent No. 3,097,098, issued July 9, 1963 for a "Shortening and Agent Therefor."

As used herein the term "cloud point" of a liquid base oil or emulsifier is a temperature which is equal to the temperature of the emulsifier or liquid base oil determined in the following manner. A sample of the liquid base oil or emulsifier is heated to approximately 130° C., filtered, and placed in a cloud point beaker having parallel sides and made of precision bore Pyrex tubing having inside dimensions between the parallel sides of 1.751±.001 inches and outside dimensions of 1.92±.01 inches. Such a cloud point beaker is a standard cloud point beaker, is well known in the art, and no further description thereof is necessary. The temperature of the sample in the beaker is adjusted to 70-75° C. and the beaker placed in a container having a circulating cold water bath with a temperature of 35°±1° F. and sufficient flow of water to cool the sample from 60° C. to 40° C. in 70±5 seconds. The container of the circulating water bath receives the beaker in such a manner that opposite portions of the container contact the beaker at opposite points on the parallel sides of the beaker so that a light source may be directed against the beaker on one side and a photoelectric cell may receive the light passing through the beaker without the light passing through any water in the water bath. During the cooling from 60° C. to 40° C. and continued cooling thereafter the sample is continuously agitated. When the temperature of the sample is 50° C. the distance between the light source and the photoelectric cell is adjusted so that the cell detects 30 lumens of light. The light source and cell are then left at this distance with respect to each other during the continued cooling of the sample and when the sample in the beaker becomes so cloudy that the amount of light passing through it is reduced to 5 lumens the temperature of the sample is read and this is used as the cloud point.

The cloud point of either the emulsifier or the liquid base oil is believed to be below its alpha melting point as the alpha melting point is near the lower limit to which glycerides can be supercooled, but applicants are not so be bound by this theory.

The capillary melting point was determined by the capillary tube melting point determination which is the American Oil Chemists' Society official method Cc 1–25. This method is well known in the art and no further description thereof is necessary. In order to determine the capillary melting point of the crystals in the vegetable oil these crystals were removed by conventional fractional crystallization and filtration of the vegetable oil prior to having their capillary melting point determined.

Some vegetable oils such as cottonseed oil have solid crystals naturally occurring somewhere in the temperature range of approximately 32° to 100° F. Other oils such as soybean oil need to be partially hydrogenated to obtain these crystals. The amount of solid crystals in the vegetable oil and the liquid base oil does not itself constitute the present invention as the desirability of such crystals in liquid shortenings is well known, the amount varies considerably, and any of the conventionally employed amounts are suitable for the purpose of this invention and so no further description thereof is necessary.

The rapid cooling of the blend, emulsifier, or liquid base oil referred to herein means cooling in less than approximately three minutes.

As used herein "temperature slightly below the cloud point" means a temperature below the cloud point but not so far below the cloud point that the liquid involved is substantially solidified.

EXAMPLE 1

The liquid base oil of the shortening was prepared by blending 93.7 parts of partially hydrogenated soybean oil having an iodine value of 109 with 6.3 parts of hydrogenated soybean oil having a titer of 63 which resulted in a liquid base oil having an iodine value of 104, a cloud point of 88.9° F. and a capillary melting point of 129.6° F. The 109 iodine value hydrogenated soybean oil had crystals in it at room temperature and these crystals had a capillary melting point of approximately 100° F. The emulsifier was a solid material which was superglycerinated 52 titer tallow which had an alpha monoglyceride content of 40%. Its cloud point was 122° F. and its capillary melting point 126.4° F. Four parts of the emulsifier were blended with 100 parts of the liquid base oil and the mixture heated to 160° F. under agitation until all crystals were completely melted. The blend was then cooled to 111° F. in approximately 1½ minutes by one pass through a "Votator" type chilling machine which is a scraped wall heat exchanger of the type well known in the art. The temperature of the blend was allowed to rise to about 120° F. through heat of crystallization and was agitated for one hour at this temperature. The blend was then cooled to 80° F. in approximately 1½ minutes in a single pass through the Votator and then heated to 90° F. and held at that temperature for approximately one hour under agitation. Agitation was stopped and separate samples of the shortening were collected and held at temperatures of 60°, 70°, 80°, 90°, and 100° F. for one month. During this period of time each of these samples remained pourable and the suspension stable.

EXAMPLE 2

The liquid base oil was prepared from the same ingredients as the liquid base oil in Example 1 above except that 99.5 parts of the 109 iodine value soybean oil were blended with 0.5 parts of the 63 titer hydrogenated soybean oil. This gave a liquid base oil having an iodine value of 108.2, a cloud point of 57.6° F. and a capillary melting point of 106.2° F. The capillary melting point of the crystals of the 109 iodine value soybean oil was approximately 100° F. The emulsifier was prepared by blending 3.6 parts of superglycerinated 63 titer hydrogenated peanut oil having 40% alpha monoglycerides with 8.6 parts of an emulsifier made in accordance with the process for making the shortening agent of Patent No. 3,097,098 issued July 9, 1963 for a Shortening and Agent Therefor and contained 65% monoesters of propylene glycol, 20% monoglycerides, and the remainder being unreacted triglycerides, diglycerides, and di-esters of propylene glycol. This emulsifier had a cloud point of 116.6° F. and a capillary melting point of 116.8° F. This emulsifier was a solid at room temperature. 100 parts of liquid base oil and 12.2 parts of the emulsifier were mixed together and heated to 150° F. under agitation resulting in a complete melting of all crystals. The blend was then cooled to 100° F. in approximately 1½ minutes and one pass through a Votator and then allowed to rise by heat of crystallization to a temperature of 108° F. where it was agitated for one hour. The blend was then cooled to 60° F. in approximately 1½ minutes by passing it through a Votator and then warmed by heat of crystallization to 80° F., held at the latter temperature for one hour and agitated during that period of time. After the agitation was stopped samples of the liquid shortening were collected and held at temperatures of 60°, 70°, 80°, 90° and 100° F. for one month. During this period of time the samples of shortening remained pourable and the suspension stable.

EXAMPLE 3

The liquid base oil of the shortening was prepared by blending 99.5 parts of refined bleached cottonseed oil with 0.5 parts of hydrogenated soybean oil having a titer of 63 which resulted in a liquid base oil having an iodine value of 109.2, a cloud point of 61.2° F. and a capillary melting point of 112.4° F. The refined bleached cottonseed oil had crystals naturally occurring in it at room temperature and these crystals had a capillary melting point of approximately 80° F. A solid emulsifier was prepared by blending 3.5 parts of superglycerinated 52 titer hydrogenated blend of 60% lard and 40% tallow (40% alpha monoglyceride content) with 8.5 parts of an emulsifier made in accordance with the process for making the shortening agent of patent No. 3,097,098 issued July 9, 1963 for a Shortening and Agent Therefor and containing 65% monoesters of propylene glycol, 19% monoglycerides, and the remainder being unreacted triglycerides, diglycerides, and di-esters of propylene glycol. This emulsifier had a cloud point of 116.6° F. and a capillary melting point of 116.8° F. 100 parts of liquid base oil and 12 parts of the emulsifier were blended and subjected to the same treatment as the blend of emulsifier and liquid base oil of Example 2 and resulted in a liquid shortening which had essentially the same characteristics of stability and remained pourable with the same range of temperatures as that produced by Example 2.

EXAMPLE 4

In this example 99.5 parts of the same 109 iodine value hydrogenated soybean oil and .5 parts of the same 63 titer hydrogenated soybean oil as used in Example 2 and 12 parts of the same emulsifier as used in Example 3 were used to make the liquid shortening. The emulsifier and the 63 titer hydrogenated soybean oil were heated together to 140° F. causing them to be completely melted. This mixture was added to the 109 iodine value soybean oil which has been heated to 95° F. and the entire blend agitated. The temperature of the blend was 104° F. which resulted in an almost instantaneous cooling of the 63 titer soybean oil and the emulsifier to this 104° F. The blend was homogenized in a Votator without refrigeration and then allowed to rise to 105° F. through heat of crystallization and agitated for approximately one hour. Next, the blend was cooled to 60° F. with a single pass through a Votator and allowed to rise from heat of crystallization to 84° F. and held at that temperature for one hour under agitation. Separate examples of this liquid shortening were collected and held at temperatures of 60°, 70°, 80°, 90° and 100° F. for one month and during this time the blend remained pourable and the suspension stable.

EXAMPLE 5

The liquid base oil was made of 92.7 parts 109 iodine value hydrogenated soybean oil and 7.3 parts of 63 titer hydrogenated soybean oil. The emulsifier was superglycerinated 100 iodine value hydrogenated soybean oil which had 40% alpha monoglycerides. The liquid base oil had an iodine value of 102.8, a cloud point of 91° F. and a capillary melting point of 131.4° F. The emulsifier had a cloud point of 83.3° F. and a capillary melting point of 113.4° F. so that the emulsifier had a lower melting point than the liquid base oil. In this example the liquid base oil was heated to 140° F. and agitated until all the crystals were melted and then cooled to 86° F. in approximately one minute in one pass through a chilled Votator. The liquid base oil was heated and agitated for about 1 hour at a temperature of 115° F. The emulsifier was heated sufficiently to melt all crystals in it, added to the liquid base oil, agitated to blend them, and the blend cooled to 75° in approximately one minute in a single pass through a chilled Votator. The blend was then heated and agitated for approximately one hour at a temperature of 103° F., agitation stopped, and separate samples of the shortening collected. These separate samples were held at temperatures of 60°, 70°, 80°, 90° and 100° F. for one month. During this time the liquid shortening remained pourable and the suspension stable.

The present invention is well suited and adapted to obtain the objects and ends and has the advantages mentioned as well as others inherent therein.

While only presently preferred examples of the invention have been given for the purpose of disclosure, the invention is to be limited by the scope of the appended claims.

In the following claims the term "emulsifier" means emulsifiers containing monoglycerides diglycerides, and mixtures thereof.

What is claimed is:

1. In a process of preparing liquid shortening which is liquid between about 60° F. and 100° F. and having a stable suspension between about 60° F. and 100° F. of crystals of emulsifier containing mono- or diglycerides or mixtures thereof and crystals of liquid base oil in liquid base oil, the emulsifier and liquid base oil being higher and lower melting point components of the liquid shortening, the improvements comprising the steps of:
   (a) forming a liquid base oil by mixing a vegetable oil containing solid crystals somewhere in the temperature range of approximately 32° F. to 100° F. with a fat that has a melting point in excess of approximately 100° F., said mixing taking place at a temperature sufficient to melt all crystals in thte fat and vegetable oil,
   (b) heating the emulsifier until all crystals contained therein are melted,
   (c) forming a blend of the melted emulsifier and liquid base oil, the heating of the vegetable oil, the fat, and the emulsifier and their blending being carried out in any order,
   (d) rapidly cooling the blend to a temperature between about 5° above and a temperature slightly below the cloud point of the higher melting point component,
   (e) agitating the blend in excess of approximately 30 minutes while maintaining the blend at a temperature between approximately that reached by heat of crystallization of the blend and the capillary melting point of the higher melting point component, (f) rapidly cooling the blend to a temperature between about 5° F. above and a temperature slightly below the cloud point of the lower melting point component, and (g) agitatitng the blend in excess of approximately 30 minutes while maintaining the blend at a temperature between approximately that reached by heat of crystallization of the blend and the capillary melting point of (i) the crystals in the vegetable oil referred to in step (a) when the liquid base oil is the lower melting point component and (ii) the emulsifier when the emulsifier is the lower melting point component.

2. The process of claim 1 in which the agitation in each of steps (e) and (g) is for approximately 60 minutes.

3. The process of claim 1 in which the vegetable oil includes soybean oil.

4. The process of claim 2 in which the vegetable oil includes soybean oil.

5. The process of claim 1 in which the vegetable oil includes cottonseed oil.

6. The process of claim 5 in which the agitation of each of steps (e) and (g) is carried on for approximately 60 minutes.

7. The process of claim 1 in which the emulsifier is the higher melting point component.

8. The process of claim 7 in which the vegetable oil includes soybean oil.

9. The process of claim 8 in which the agitation in each of steps (e) and (g) is for approximately 60 minutes.

10. The process of claim 1 in which the vegetable oil includes cottonseed oil.

11. The process of claim 10 in which the agitation in each of steps (e) and (g) is carried on for approximately 60 minutes.

12. In a process of preparing liquid shortening which is liquid between about 60° F. and 100° F. and having a stable suspension between about 60° F. and 100° F. of discrete particles of emulsifier containing mono- or di-glycerides or mixtures thereof and particles of liquid base oil in liquid base oil, the liquid base oil having a higher melting point than the emulsifier, the improvement comprising the steps of:

(a) forming a liquid base oil by mixing a vegetable oil containing solid crystals somewhere in the temperature range of approximately 32° F. to 100° F. with a fat that has a melting point in excess of approximately 100° F., said mixing taking place at a temperature sufficient to melt all crystals in the fat and vegetable oil, (b) rapidly cooling the liquid base oil to a temperature between about 5° above and a temperature slightly below the cloud point of the liquid base oil, (c) agitating the liquid base oil in excess of approximately 30 minutes while maintaining the liquid base oil at a temperature between approximately that reached by its heat of crystallization and the capillary melting point of the liquid base oil, (d) heating the emulsifier until all crystals contained therein are melted, (e) forming a blend of the emulsifier and liquid base oil, (f) rapidly cooling the blend to a temperature between about 5° above and temperatures slightly below the cloud point of the emulsifier, and (g) agitating the blend in excess of approximately 30 minutes while maintaining the blend at a temperature between approximately that reached by its heat of crystallization and the capillary melting point of the emulsifier.

13. The process of claim 12 in which external heat is applied in each of the steps (c) and (g).

14. The process of claim 12 in which the vegetable oil includes soybean oil.

15. The process of claim 13 in which the vegetable oil includes soybean oil.

16. The process of claim 1 in which the fat in step (a) is present in an amount between approximately 0.5 and 7.0% of the liquid base oil.

17. The process of claim 12 in which the fat in step (a) is present in an amount between approximately 0.5 and 7.0% of the liquid base oil.

References Cited

UNITED STATES PATENTS 3,369,909   2/1968   Schroeder et al. _____ 99—118

MAURICE W. GREENSTEIN, Primary Examiner.